(12) United States Patent
Shim

(10) Patent No.: US 8,757,911 B2
(45) Date of Patent: Jun. 24, 2014

(54) ATTENTION ENHANCING WRITING INSTRUMENT ACCESSORY AND METHOD OF USE

(71) Applicant: Dongseok Shim, Centreville, VA (US)

(72) Inventor: Dongseok Shim, Centreville, VA (US)

(*) Notice: Subject to any disclaimer, the term of this patent is extended or adjusted under 35 U.S.C. 154(b) by 0 days.

(21) Appl. No.: 13/647,109

(22) Filed: Oct. 8, 2012

(65) Prior Publication Data

US 2014/0099611 A1 Apr. 10, 2014

(51) Int. Cl.
*A46B 5/02* (2006.01)

(52) U.S. Cl.
USPC .................................... 401/6; 401/48

(58) Field of Classification Search
CPC .. B43K 23/001; B43K 23/004; B43K 23/008; B43K 23/012; B43K 23/016; B43K 29/00; G09B 11/00; G09B 11/02; B43L 15/00
USPC ............ 401/6–8, 48, 195, 131; 434/162, 166; 482/44
See application file for complete search history.

(56) References Cited

U.S. PATENT DOCUMENTS

| 1,607,775 A | * | 11/1926 | Murray et al. | ................. 434/166 |
| 2,866,440 A | * | 12/1958 | Green | ............................ 434/166 |
| 3,666,372 A | * | 5/1972 | Lipkowski | ........................ 401/8 |
| 6,450,718 B1 | * | 9/2002 | Spruill | .......................... 401/131 |

* cited by examiner

*Primary Examiner* — David Walczak
(74) *Attorney, Agent, or Firm* — Dale J. Ream

(57) ABSTRACT

A writing instrument accessory for use with a writing instrument includes a sleeve having a tubular configuration defining upper and lower ends, the sleeve being configured to receive the writing instrument. The accessory includes an elastic member coupled at one end to the sleeve and extending away from the sleeve to another end opposite the sleeve, the elastic member having a stretchable and resilient configuration. A hook member is coupled to the elastic member at the end opposite the sleeve, the hook member having a configuration complementary to a shape of a person's finger so as to be selectively coupled thereto. In operation, the elastic member is held at length by a user's non-writing hand finger from the writing instrument while a writing task is undertaken by the user.

12 Claims, 5 Drawing Sheets

ATTENTION ENHANCING WRITING INSTRUMENT ACCESSORY AND METHOD OF USE

BACKGROUND OF INVENTION

1. Field of Invention

The present invention relates to writing instruments and, more particularly, to a writing instrument accessory device that enhances the concentration of a user while writing. More particularly, the present invention includes a sleeve configured for attachment to a writing instrument and an elastic member that extends from the sleeve to a hook member configured to be grasped by or coupled to a user's finger so as to enhance the attention of the user.

2. Description of the Related Art

According to the United States Centers for Disease Control and Prevention, 9.5% or 5.4 million children 4-17 years of age have been diagnosed with Attention Deficit Hyperactivity Disorder (ADHD) as of 2007. Rates of ADHD diagnosis increased an average of 3% per year from 1997 to 2006 and an average of 5.5% per year from 2003 to 2007, making a 22% increase between 2003 and 2007. The symptoms of ADHD include inability to pay and sustain attention, hyper-activeness, and impulsiveness. Often times, these symptoms hinder children from learning at school or home, making it hard for them to follow instructions and do assignments. Children with ADHD do not outgrow such behaviors and these symptoms continue into adulthood for about 60% of children with ADHD, which translates into 4% of the United States population. There are a number of treatments available for ADHD such as behavioral therapy, but the majority of treatment is done by medication but does not necessarily cure the disorder.

On the other hand, an increasing number of people find it challenging to pay or sustain attention largely due to the constant exposure of different stimulants, especially through electronic devices such as smart phones, cell phones, and portable tablets. It is reported that with those electronic devices, people display shorter attention spans, poor communication skills, and lower productivity. Such habits can be easily carried over to other areas in daily life even in the absence of the electronic devices. In essence, inability to focus and stay focused has become a pandemic issue in the present time.

Therefore, there is a need for a writing instrument accessory that couples a writing instrument with a user's non-writing hand in a manner that helps individual's focus and stay focused while writing. Further, there is a need for a writing instrument accessory that includes an adjustable length elastic member extending between a writing instrument sleeve and a hook so as to give flexibility to a person using the device.

SUMMARY OF THE INVENTION

A writing instrument accessory for use with a writing instrument according to the present invention includes a sleeve having a tubular configuration defining upper and lower ends, the sleeve being configured to receive the writing instrument. The accessory includes an elastic member coupled at one end to the sleeve and extending away from the sleeve to another end opposite the sleeve, the elastic member having a stretchable and resilient configuration. A hook member is coupled to the elastic member at the end opposite the sleeve, the hook member having a configuration complementary to a shape of a person's finger so as to be selectively coupled thereto.

Therefore, a general objective of the present invention is to provide a writing instrument accessory that dominates over other stimuli and eliminates other stimuli other than the presented task, helping an individual with ADHD and an individual with a short attention span focus.

Another objective of the present invention is to provide a writing instrument accessory, as aforesaid, that includes a sleeve configured to be coupled to a writing instrument and an elastic member with a hook at the end to be stretched out and held by the index finger of the non-writing, opposite hand.

Still another objective of the invention is to provide a writing instrument accessory, as aforesaid, having a contoured rubber grip for writing comfort when the elastic member is not stretched out and rolled around the pen. The rubber hook part of the attachment device is designed to fit around the sleeve part of the device so that the elastic band can remain rolled around the sleeve when not in use.

A further objective of the invention is to provide a writing instrument accessory, as aforesaid, in which the rubber sleeve may be adjusted along the pen to be put on at a desired height and position. It is preferred that the sleeve part is made flexible enough to slide along the height, however, firm enough maintain its position once it is at a desired place.

Other objects and advantages of the present invention will become apparent from the following description taken in connection with the accompanying drawings, wherein is set forth by way of illustration and example, embodiments of this invention.

DETAILED DESCRIPTION OF THE INVENTION

Figure 1:
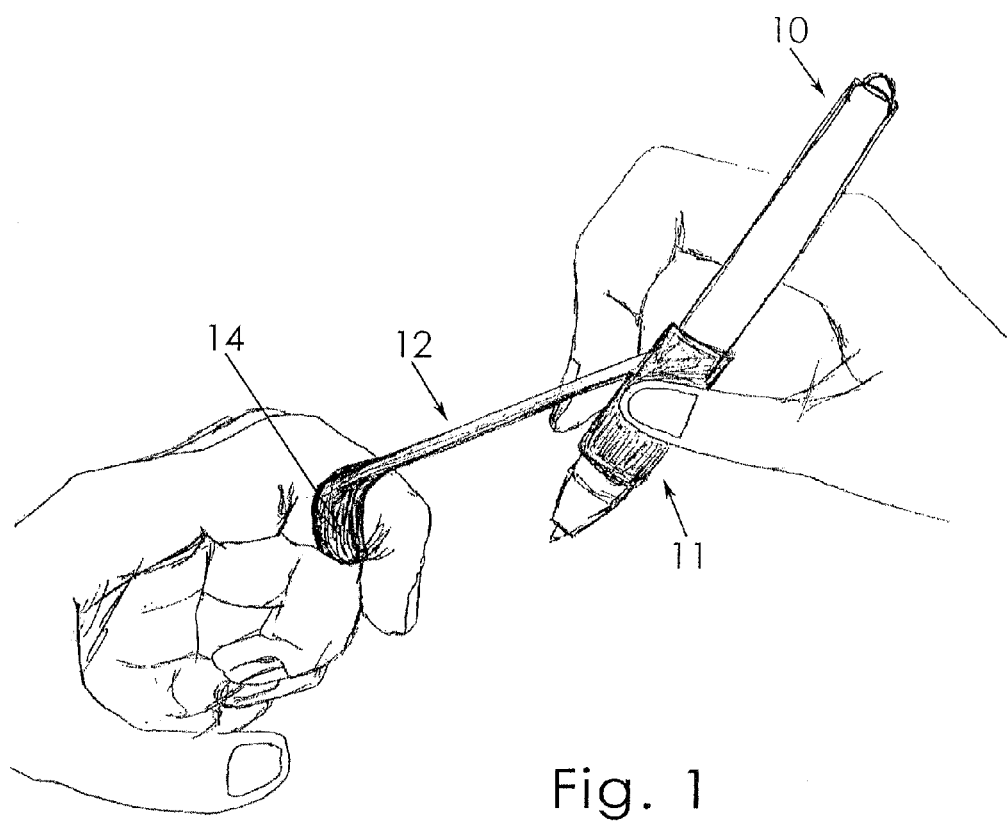
FIG. 1 is a perspective view of a writing instrument accessory according to a preferred embodiment of the present invention with an elastic member being held by one hand and hooked by the opposite hand.
Figure 2:
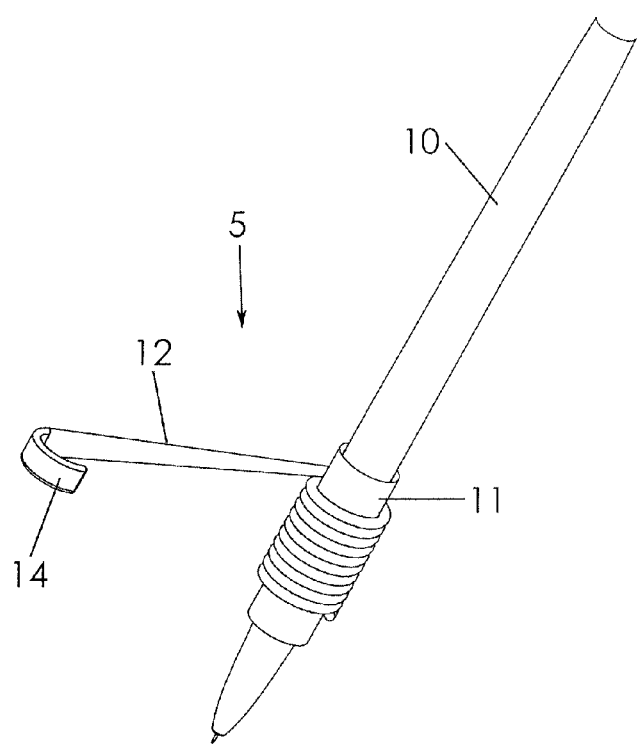
FIG. 2 is a perspective view of the writing instrument accessory as in FIG. 1 removed from a user's hand.
Figure 3:
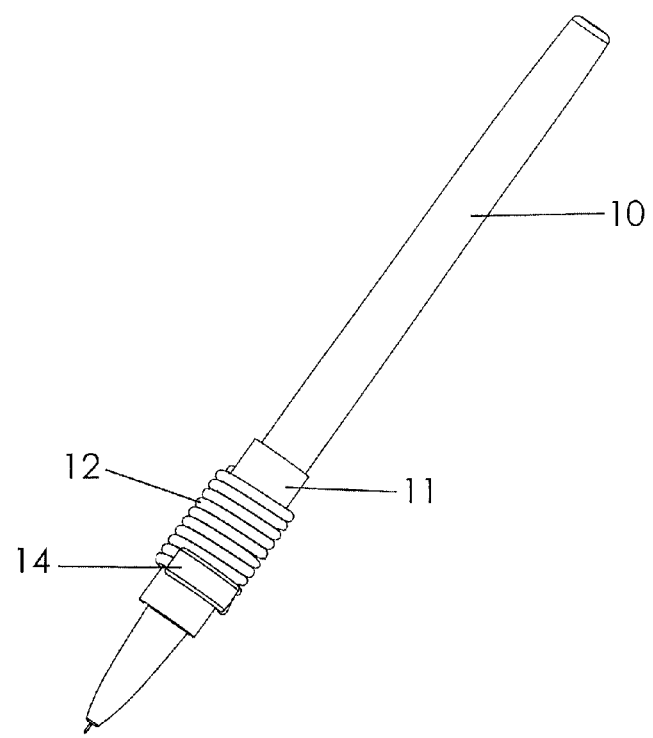
FIG. 3 is a perspective view of the writing instrument of FIG. 1 when an elastic member of the device is not stretched and rolled around the sleeve, showing the hook locked onto the sleeve.
Figure 4:
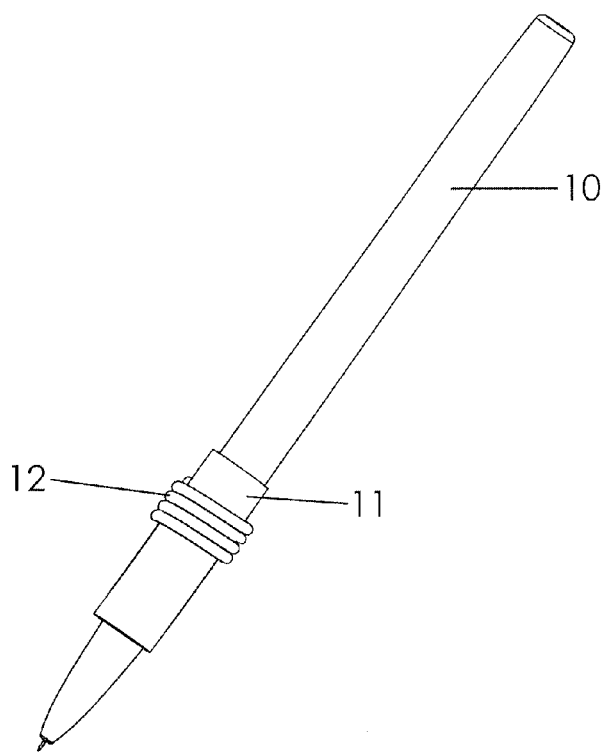
FIG. 4 is a another perspective view of the writing instrument accessory as in FIG. 3, showing the opposite side.
Figure 5:
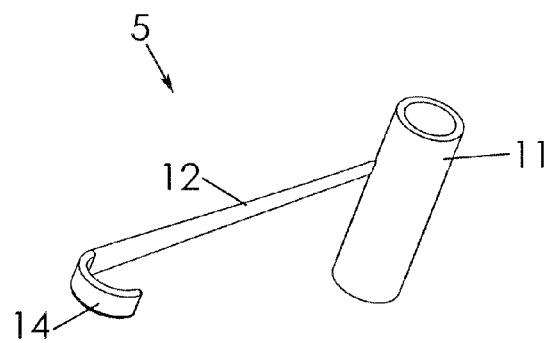
FIG. 5 is an exploded perspective view of the writing instrument accessory composed of a sleeve, an elastic string, and a hook.
Figure 6:
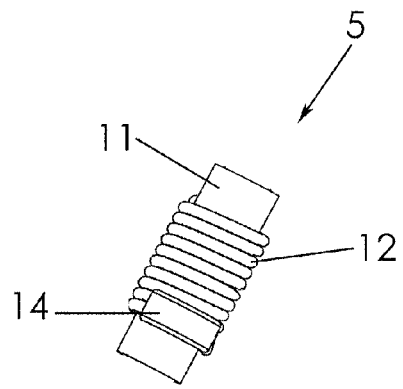
FIG. 6 is another view as in FIG. 5, showing the opposite side.
Figure 7:
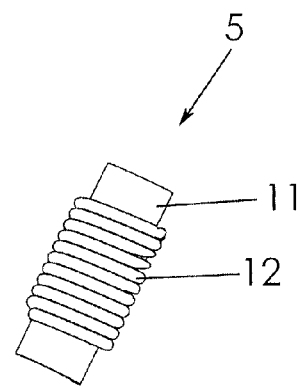
FIG. 7 is another view as in FIG. 6, showing the opposite side.

An attention enhancing writing instrument accessory according to a preferred embodiment of the present invention will now be described with reference to FIGS. 1 to 7 of the accompanying drawings. The writing instrument accessory 5 includes a sleeve 11 that may be selectively coupled to a writing instrument 10, an elastic member 12, and a hook member 14.

The sleeve 11 includes a generally tubular configuration defining open ends so as to be slidably received onto a writing instrument such as a pen or pencil. The sleeve 11 may be constructed of a rubber or other moderately elastic material that may conform to the diameter of various writing instruments. Preferably, the sleeve 11 may be positioned proximate the end of a writing instrument 10 where a user's fingers are positioned when writing although the sleeve may be slidably moved longitudinally along the writing instrument 10. The sleeve 11 may be contoured to provide comfort to a user's fingers when gripping the writing instrument 10.

The elastic member 12 is coupled at one end to the sleeve 11 and extends away therefrom. The elastic member 12 may be constructed of rubber so that its length is variable, such as with a rubber band. The elastic member 12 may be resilient so as to return to an unbiased configuration when not being stretched. More particularly, the elastic member may be about 4 inches in length at a normal configuration but may be stretched to about 5 to 6 inches.

The hook member 14 is coupled to and end of the elastic member 12 opposite the sleeve 11. The hook member 14 may have a generally U-shaped configuration complementary to the shape of a portion of a person's finger so as to be removably held by or coupled to the finger. Other curved or circular configurations may also work. When the hook member 14 is not coupled to a finger, the elastic member 12 may be wrapped around the sleeve 11 and writing instrument 10. The hook member 14 may include a width that is greater than a width of the elastic member and be configured to be secured in said sleeve 11 for storage.

The writing instrument accessory may be used in a method for enhancing concentration of a person using a writing instrument. The method of use includes positioning the sleeve 11 on a writing instrument 10, extending the elastic member 12 away from the sleeve 11, and coupling the hook member 14 to a user's finger on his non-writing hand. The method includes maintaining the elastic member at a full length distance from the sleeve while a user writes with the writing instrument. In other words, the elastic member is to be maintained generally tight and without slack between the sleeve member and the user's finger while the user completes a writing task.

Maintaining the elastic member length is a physical as well as a mental stimulus that may dominate over other stimuli that arouse mental stimuli alone. As a result, in the effort to maintain the elastic member, the dominating thoughts and tasks are reduced down to two: (1) maintaining the elastic member length itself and (2) the presented task to be done such as writing down or reading.

It is understood that while certain forms of this invention have been illustrated and described, it is not limited thereto except insofar as such limitations are included in the following claims and allowable functional equivalents thereof.

What is claimed is:

1. A writing instrument accessory for use with a writing instrument, comprising:
    a sleeve having a tubular configuration defining upper and lower ends, said sleeve configured to receive the writing instrument;
    an adjustable length elastic member coupled at one end to said sleeve and extending away from said sleeve to another end selectively displaced from said sleeve, said elastic member having a stretchable and resilient configuration; and
    a hook member coupled to said elastic member at said end selectively displaced from said sleeve, said hook member having a configuration complementary to a shape of a person's finger so as to be selectively coupled thereto when displaced from said sleeve;
    wherein said elastic member is selectively movable between one configuration wrapped around said sleeve and another configuration extending away from sleeve.

2. The writing instrument accessory as in claim 1, wherein said sleeve includes a contoured configuration constructed of a rubber material so as to provide a secure and comfortable grip by a person's fingers.

3. The writing instrument accessory as in claim 1, wherein said elastic member is constructed of rubber and is resilient.

4. The writing instrument accessory as in claim 1, wherein said hook member includes a width greater than a width of said elastic member.

5. A method for enhancing concentration of a person having a writing hand for using a writing instrument and non-writing hand, comprising the steps:
    providing a writing instrument accessory having:
        a sleeve having a tubular configuration defining upper and lower ends, said sleeve configured to receive the writing instrument therein;
        an elastic member coupled at one end to said sleeve and extending away from said sleeve to another end opposite said sleeve, said elastic member having a stretchable and resilient configuration;
        a hook member coupled said elastic member at said another end opposite said sleeve, said hook member having a configuration complementary to a shape of a person's finger on the opposite use hand so as to be selectively coupled thereto;
    coupling said one end of said sleeve to a writing instrument;
    extending said elastic member away from said sleeve; and
    securing said hook member to a finger of the person's non-writing hand.

6. The method as in claim 5, further comprising the step of maintaining said elastic member at a full length distance from said sleeve while a user writes with the writing instrument.

7. The method as in claim 5, further comprising the step of maintaining said elastic member without slack while a user writes with the writing instrument.

8. The method as in claim 5, further comprising the steps of:
    releasing said hook member from the finger of the person's non-writing hand when use of said writing instrument accessory is finished; and
    wrapping said elastic member around said sleeve; and
    securing said hook member to said sleeve.

9. The method as in claim 5, said sleeve includes a contoured configuration constructed of a rubber material so as to provide a secure and comfortable grip by a person's fingers.

10. The method as in claim 5, wherein said elastic member is constructed of rubber and is resilient.

11. The method as in claim 5, wherein said hook member includes a width greater than a width of said elastic member.

12. The writing instrument accessory as in claim 1, wherein said elastic member is stretchable from about 4 inches to a length of about 5 inches.

\* \* \* \* \*